March 23, 1954 — R. W. CONANT — 2,673,150
MASKING OF PHOTOGRAPHIC COLOR FILM
Filed Sept. 12, 1952

Inventor
Russell W. Conant
by Roberts, Cushman & Grover
att'ys.

Patented Mar. 23, 1954

2,673,150

UNITED STATES PATENT OFFICE 2,673,150

MASKING OF PHOTOGRAPHIC COLOR FILM

Russell W. Conant, Los Angeles, Calif., assignor to Technicolor Motion Picture Corporation, Hollywood, Calif., a corporation of Maine Application September 12, 1952, Serial No. 309,301

8 Claims. (Cl. 95—2)

The present invention relates to color photography and more particularly to a method of correcting color film for color falsification, and to color film containing corrective mask records. The present application is a continuation in part of my copending application Serial No. 15,863, filed March 19, 1948, now abandoned.

Photographic color records which consist of superimposed records in subtractive coloring matter are subject to detrimental effects of imperfect properties of components involved in making the records, particularly defective transmission of the subtractive coloring matters. These coloring matters, in most instances dyes, instead of absorbing only the spectral range of the color aspect which they record, absorb in addition spectral ranges which are recorded in other dyes of the same picture. For example, the cyan (red absorbing) dye which is used for reproducing the red filter aspects, absorbs in addition to red light also some light in the green and blue ranges, thus falsifying the final record wherever it contains these ranges. These and other deficiencies, for example those due to imperfect properties of filters and sensitivity characteristics of emulsions, can be partially corrected by means of so-called masks. These masks are auxiliary records of appropriate photographic sign and gradation, depending upon the peculiarities of the defects to be corrected in each instance, and are used for printing in optical superimposition with main records to be corrected. Thus, in the above mentioned example, a negative low gradation mask would be made from the red aspect positive (in cyan dye), and used for printing from the blue aspect positive (in yellow dye) and the green aspect positive (in magenta dye), so that a certain amount of the blue and green light absorbing effect of the cyan dye is subtracted respectively from the blue and green aspect records, namely that much as is instead supplied by the improper blue and green light absorptions of the cyan dye. Thus, the unwanted blue and green light absorptions of the cyan dye of the red aspect positive are cancelled out.

Theoretically, a maximum color correction can be carried out with the aid of six auxiliary records, two for each main record, with gradation properties dependent upon the deficiencies to be corrected. For most practical purposes, a single mask, or if particularly effective correction is desired, two masks have been found to be sufficient. Nevertheless, masking with auxiliary records which are derived by exposure from the main records introduce into the photographic process as a whole certain disadvantages due among other factors to the necessity of using separate auxiliary records with the attendant problems of processing and registration. These disadvantages are particularly felt in the field of color photography with so-called integral packs or multilayer photographic material also referred to as monopacks. Since conventional masking processes with detached auxiliary records introduce factors which multi-layer material otherwise inherently avoids, it has been proposed to provide integral packs with mask records in separate layers which in themselves are not required for the formation of any part of the original color image. While such integral mask layers eliminate the registering problem, they introduce other disadvantages into the already complex structures and processing techniques of multi-layer color films.

It is one of the principal objects of the present invention to provide a masking technique for multi-layer photographic material which has all the advantages of the conventional masking techniques while avoiding unattached auxiliary records as well as integral or attached emulsion layers specifically provided for masking. Other objects of the invention are to provide a multilayer color record which includes a masking record without requiring more emulsion layers than those for the main records, to provide a technique of partially removing the silver of a multi-layer photographic film which technique is particularly suitable for purposes of the present invention, and to provide process components and photographic materials which are suitable for purposes of the present invention of masking multi-layer or mono-pack film material of the conventional type.

In one of its aspects, the invention achieves these objects by recording a color original in the form of at least two registeringly superimposed main records in coloring matter contained in emulsion layers which also contain metallic silver, and thereupon substantially removing the entire silver in one of these emulsions and substantially removing the silver co-extensive with the main record in the other emulsion. In another aspect, the invention makes use of the circumstance that the silver particles co-extensive with an original dye record differ from those associated with the first or negative stage of development in number or character such as to make them differently susceptible to chemical agents suitable to affect these silver particles so that, for example, a bleaching agent can be applied which substantially affects primarily the silver co-extensive with a record obtained by conventional reversal technique leaving a silver record of photographic sign opposite to that of the reversal record. In accordance with a more specific feature of the invention, a negative mask derived from the red filter aspect is obtained by completely bleaching the silver in the outer and intermedaite, or blue and green recording layers of a multi-layer film and in obtaining a negative silver record in the lowermost layer containing the cyan positive record, by differentially bleaching the more finely divided silver in that lowermost record which fine grain silver generally speaking photographically corresponds to or is coextensive with the positive record, so that the more coarse grained silver, complementary thereto, remains and constitutes the negative mask record whose gamma can be controlled in some degree by the aforesaid bleaching technique. According to a further aspect of the invention, two masks, for example for correcting improper absorption of the cyan as well as yellow dyes is provided by proceeding according to the above characterized technique and in addition redeveloping a negative image of comparatively low gamma near the outer surface of the uppermost or blue recording layer of the multi-layer film material.

These and other objects, aspects and features will appear from the following description of two typical practical embodiments illustrating the novel characteristics of my invention. This description refers to a drawing in which Fig. 1 is a flow diagram illustrating a masking process which corrects deficiencies of the cyan printing dye;

Figures 1, 2, 3:
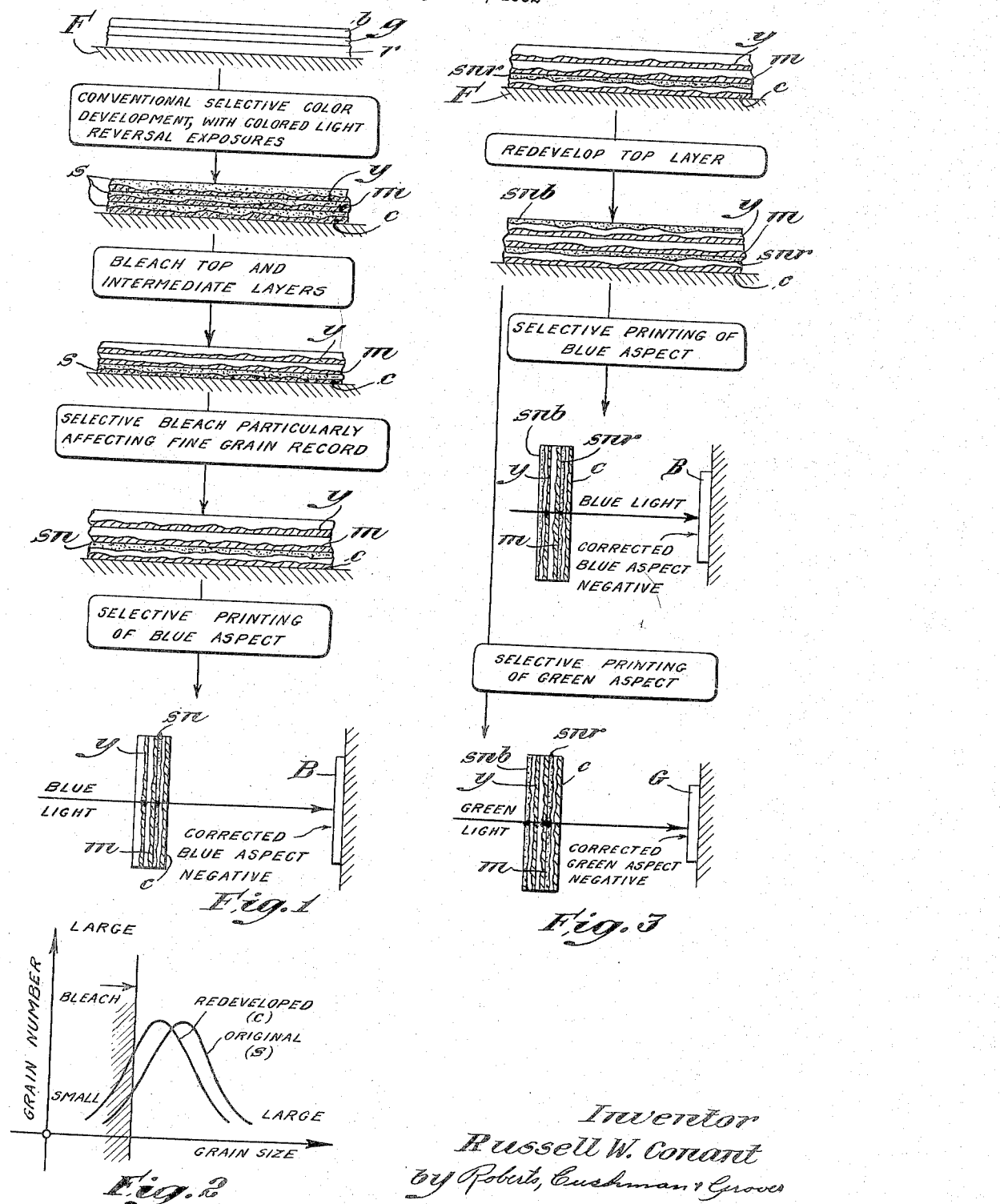
Fig. 2 is a diagram illustrating the differential bleach effect.
Fig. 3 is a similar flow diagram illustrating correction according to the invention, for deficiencies of the cyan as well as yellow dyes of a multi-layer color film.

In the figures, F indicates a support, such as nitrate or acetate cellulose film material, which support carries three emulsion layers $b$, $g$, $r$, in conventional manner sensitized and otherwise arranged to record the blue, green, and red color aspects of an original. This multi-layer sensitive material may incorporate additional layers, such as antihalation and filter layers, which are not shown in order to simplify the drawing. The commercially available film material Eastman Kodak type 5267 was found suitable for the purpose, but it should be understood that the invention is applicable to other film material of this general type.

After exposure to an original, which may be a colored scene or a record in colors, the film is subjected to conventional reversal development. This can comprise the steps of first developing all originally exposed silver halide particles, thereupon in succession selectively exposing, with colored light, the originally unexposed film layer portions of corresponding sensitivity and developing them successively in color developing solutions. An alternative technique employing film material of the type which contains in each emulsion layer a color former appropriate for producing with a suitable single developer solution a dye record appropriate for the respective layer can comprise the steps of subjecting the entire film to uniform initial development and reversal exposure, and thereupon simultaneous development of three color positives. In either case, a multi-layer film record is obtained which, as illustrated at the second stage of the flow diagram according to Fig. 1, includes yellow, magenta, and cyan positive records, the film also containing at this stage silver particles $s$ throughout each emulsion. According to conventional procedure this silver is bleached out in its entirety to produce emulsion layers which contain only the dye records.

It will be understood that the various records herein referred to are not actually strictly separated or associated with one or the other surface of an emulsion layer, as shown in the drawing for the sake of clarity. Also, wherever the present specification refers to photographically corresponding or coextensive silver and dye records, this correspondence is understood to be of the type which results for example from color development of the type wherein a silver record is produced together with a dye reocrd.

In accordance with the invention, the silver is not entirely but only partially removed in a manner peculiar to the present invention, as follows.

This differential removal of the silver is made possible by the fact that the residual silver of a partially bleached multi-layer record is itself a record and has a definite relation to the original record. It is common knowledge that the silver record corresponding to or photographically coextensive with the final positive dye record differs from the negative silver record; one difference is that its grain distribution is statistically different as compared to that of the negative record produced during the first or original development. The reversal record has more fine grain than the original record; in other words the grain size coordinate of the statistical grain distribution curve of the original record is for a given grain number per unit, greater than the size coordinate of the reversal record.

A given bleaching agent will in a given time interval totally consume grain below a certain size, while coarser grain will be diminished in size, yet remain to form a visible record. Hence, given two records of the above different grain size distribution, the record which is generally finer will be reduced in greater proportion than that of the statistically coarser grain deposit. Therefore two records of different grain distribution such as the above described original and or reversal developed records, can be differentiated in a bleaching procedure which at any given instance has removed more density from the finer grained record as compared to the coarser record. Hence by interrupting the bleach at a selected stage, a desired relation between the records can be accomplished which is useful for the present purpose, furnishing a residual negative record and a positive record of smaller contrast, the resultant of both being the desired masking record having at least approximately predeterminably gamma in the proper, namely negative sense, and in the range useful for color correction masking. This selective effect is illustrated in Fig. 2 which shows the distribution curves of original and reversal records and indicates the differentiating effect of a bleach which has acted long enough to eliminate all grain up to a certain size.

If the mask is to be formed in the lowermost or intermediate layer it is desirable to use a bleaching technique which accomplishes the desired distribution, namely essentially no silver in the upper layers or layer and silver remaining in the layer therebelow sufficient for providing the mask record in the above manner. This result, namely essentially complete removal of silver from the upper layers while the above control takes place in the layer therebelow, can be accomplished with one and the same bleach, but it is easier to bleach the upper layers essentially completely with a comparatively strong acting bleach which is stopped when it reaches the region between upper and lower layers, whereupon the lower layer is subjected to a more prolonged and hence better controllable bleach to attain the masking record in the above outlined manner.

Accordingly, and referred again to Fig. 1, the film which now carries yellow, magenta and cyan dye images, indicated at $y$, $m$ and $c$ of Fig. 1, and in addition thereto silver throughout the three emulsions, as indicated at $s$ of Fig. 1, is first subjected to a preliminary concentrated bleach, for example according to the following technique.

Soak in water for five minutes; bleach for 45 seconds in a solution containing 47 grams per litre of sodium dipotassium ferricyanide ($K_2NaFe[CN]_6$) and 20 grams per litre of potassium bromide (KBr); stop the bleach by soaking the film material for one minute in a solution of 20 grams $NaHSO_3$ per litre of solution; and rinse in water for 30 seconds.

This bleaching bath removes the silver from layers $b$ and $g$, but leaves a substantial portion of the silver in the lowermost layer $r$.

A selective bleach, more dilute in accordance with the above principle, is now applied as follows.

Bleach for one minute in a solution containing 23 grams per litre of $K_2NaFe(CN)_6$, and 10 grams per litre of KBr; stop this bleach by soaking the film material for one minute in a solution of $NaHSO_3$ in 20 grams per litre of solution; soak for seven minutes in a solution of 250 grams per litre of fixing salt, $Na_2S_2O_3.5H_2O$; wash in water for 10 minutes; blow off the excess water; and dry.

This selective bleach removes a considerable part of the remaining silver image, leaving a residual record $sn$ (Fig. 1) which is negative in character and has, as mentioned above, a contrast which is within the range usable for color correction masking. It will now be understood that this remaining record originates predominantly in the previously coarser grained, negative record.

The result is a film which contains positives $y$, $m$, and $c$ in subtractive dye, and a mask negative $sn$ in silver having a gamma of about 0.15. A higher gamma, for example of 0.20 as utilized in the embodiment according to Fig. 2, can be obtained by conventional control of the above indicated bleaching technique which is enhanced by the prolonged time available if the dilute bleach is used, although it is understood that in instances not requiring particularly exact control, the more concentrated bleach which permits only more restricted control possibilities can be used throughout.

A set of mask corrected separation negatives can now be made from the original containing the silver mask record $sn$, by consecutively printing with blue, green and red light. During the printings with blue and green light the mask cancels the unwanted blue and green absorption, respectively, of the cyan dye to the extent represented by the gamma of the mask. Better blue and green separation negatives result. Fig. 1 shows this printing step for the blue aspect separation negative B, indicating absorption of the blue printing light by the yellow dye of the blue aspect positive $y$ and by the mask record $sn$. The mask $sn$ has no corrective effect with regard to the red aspect printing, but reduces the printing contrast of the red aspect separation negative, which contrast can be restored by proper choice of developing time in conventional manner.

If it is desired to correct also for the improper absorption of the yellow dye in the green spectral range, a mask has to be introduced which is derived from the blue filter aspect, according to the invention. This record is produced in the outer layer by partly redeveloping the silver salt obtained by bleaching the outer layer.

This double masking technique is indicated in Fig. 3 which shows as its first step the film shown in the fourth step of Fig. 1, namely the film containing three dye records $y$, $m$, $c$ and the silver mask record $sn$ in the lower layer $c$. By redeveloping the outer layer, a low gamma mask record $snb$ is obtained in addition to the above mentioned red aspect mask record $sn$, denoted $snr$ in Fig. 3.

This redevelopment of a thin negative record in the upper layer can be carried through for example as follows:

Wash in a water bath for 5 minutes; bleach for 75 seconds in a solution of sodium hexametophosphate (Calgon) 0.5 gram, potassium bromide (KBr) 20.0 gram and sodium dipotassium ferricyanide [$K_2NaFe(CN)_6$] 50.0 gram in water to make 1.0 litre; and stop the bleach by soaking for one minute in a 20 gram per litre solution of sodium bisulphite ($NaHSO_3$). Apply now the more diluted bleach described above, namely 23 grams per litre of $K_2NaFe(CN)_6$ and 10 grams of KBr, stop this bleach with the above $NaHSO_3$ solution, wash in water for 1 minute; redevelop for 30 seconds in an MQ developer of conventional composition; wash in water for 3 minutes; fix in hypo solution for 7 minutes; and wash in water for 10 minutes. The temperature of all liquid baths should be about 70° F.

The above described procedure results with film material of the above indicated type, in a blue aspect masking record $snb$ having a gamma of about 0.10. A red aspect masking record $snr$ having a gamma of about 0.20 can be obtained in the manner described with reference to Fig. 1, and after these bleaches, very little silver remains in the middle or green aspect layer.

Individual color separation records are then printed with blue, green and red light, as described above with reference to Fig. 1. During the printing with blue light, the blue aspect record, defined by the yellow dye record $y$ together with the blue aspect mask $snb$, is corrected by the red aspect mask $snr$ for undesirable absorption of the cyan dye in the blue range. It will be noted that in this printing the mask $snb$ has no corrective function since it is a blue aspect record. It merely reduces the contrast of the blue aspect separation negative which can be easily restored to any desired value by proper choice of separation negative developing time. During the printing with green light of the magenta dye record $m$, the red aspect mask $snr$ and the blue aspect mask $snb$ provide correction for the unwanted absorptions of the yellow dye and the cyan dye in the green range. During the printing with red light of the red aspect record, defined by the cyan dye record $c$ together with the red aspect mask $snr$, this mask

*snr* has no masking effect but causes considerable reduction of contrast which can be corrected by development control. The blue aspect mask *snb* tends to effect, during this red light printing, cancellation of the unwanted absorption of the yellow dye in the red range. This latter effect will most likely be an overcorrection since the absorption of the yellow dye in the red range is quite slight. However, since the gamma of the blue aspect mask *snb* is relatively low, this overcorrection is negligible.

As indicated above, the gammas of the various records can be so controlled by conventional methods that the presence of two masks during all three printings is either beneficial or unobjectionable. If desired, mask records can be bleached out after making the print or prints for which they are needed.

It will be evident that the invention does not necessarily have to be carried out with the purpose of obtaining, as final results, three separation negatives, but can be used for making prints on multi-layer material, whereby the colored light used for the corrective printing will only affect the layer which is sensitive thereto, in accordance with the particular construction of the multi-layer copying material.

It will further be observed that the invention is not limited to the particular spectral ranges discussed above by way of example, but that it can be utilized for correcting colored records in any spectral ranges suitable for various purposes.

While the above described technique proved satisfactory for commercially available multilayer film, variations in the characteristics of the emulsion layers may require changes in treatment times or concentrations which are to be determined by the customary production tests.

It should be understood that the present disclosure is for the purpose of illustration only and that this invention includes all modifications and equivalents which fall within the scope of the appended claims.

I claim:

1. In the art of correcting color photographs for deficiencies of color rendition, the method comprising the steps of recording a color original in film having at least two superimposed silver halide layers; developing the exposed portions in black and white developer; reversal developing the residual records in color forming developer, thereby producing negative comparatively coarse grain silver records and positive records co-extensive with the color developed records, of comparatively finer grain, and susceptible to removal by a seelctive bleaching agent which has less effect on said coarse grain records than on said fine grain records; removing substantially the entire silver in one of said layers; and treating the other layer with said selective bleaching agent for a time sufficient to remove a substantial portion of the silver of said fine grain positive record but to leave a corrective silver mask consisting predominantly of coarser grain and being of lower gamma than said color developed records.

2. The method according to claim 1 wherein said fine grain silver in said other layer is removed by time limited treatment in a solution containing alkali metal ferricyanide and alkali metal halide.

3. The method according to claim 1 wherein said silver in said one of said layers is essentially removed with a comparatively concentrated bleaching agent and said silver in said other layer is bleached with a comparatively dilute bleaching agent.

4. The method according to claim 3 wherein said bleaching agents are compartively concentrated and dilute solutions, respectively, of essentially the same agent.

5. The method according to claim 4 wherein said bleaching agent is a solution containing alkali metal ferricyanide and alkali metal halide.

6. In the art of correcting color photographs for deficiences of cyan dyes, the method comprising the steps of recording blue, green and red aspects of a color original in film having three superimposed silver halide layers for the respective aspects; developing the exposed portions in black and white developer; reversal developing the residual records in yellow, magenta and cyan color forming developers, respectively, thereby producing negative comparatively coarse grain silver records and positive records co-extensive with the color developed records, of comparatively finer grain, and susceptible to removal by a selective bleaching agent which has less effect on said coarse grain records than on said finer grain records, removing substantially the entire silver in said yellow and magenta developed layers; and treating the cyan developed layer with said selective bleaching agent for a time sufficient to remove a substantial portion of the silver of said fine grain positive record but to leave a corrective silver mask consisting predominantly of coarser grain and being of lower gamma than said color developed records.

7. In the art of correcting color photographs for deficiencies of color rendition, the method comprising the steps of recording a color original in film having three superimposed silver halide layers; developing the exposed portions in black and white developer; reversal developing the residual records in color forming developer, thereby producing negative comparatively coarse grain silver records and positive records co-extensive with the color developed records, of comparatively finer grain, and susceptible to removal by a selective bleaching agent which has less effect on said coarse grain records than on said finer grain records; converting substantially the entire silver in two of said layers into a redevelopable optically substantially ineffective compound; treating the third layer with said selective bleaching agent for a time sufficient to remove a substantial portion of the silver of said fine grain positive record but to leave a corrective silver mask consisting predominantly of coarser grain and being of lower gamma than said color developed records; and redeveloping in one of said two layers a part of said compound which corresponds essentially to said coarse grain record, to an extent sufficient to form a corrective silver mask of lower gamma than said color developed records.

8. In the art of correcting color photographs for deficiencies of color rendition, the method comprising the steps of recording blue, green and red aspects of a color original in film having three superimposed silver halide layers; developing the exposed portions in black and white developer; reversal developing the residual records in yellow, magenta and cyan color forming developer, thereby producing negative comparatively coarse grain silver records and positive records co-extensive with the color developed records, of comparatively finer grain, and susceptible to removal by a selective bleaching agent which has less effect on said coarse grain records than on said finer grain records; converting substantially the entire silver in the yellow and magenta developed layers into a redevelopable optically substantially ineffective compound; treating the cyan developed layer with said selective bleaching agent for a time sufficient to remove a substantial portion of the silver of said fine grain positive record but to leave a corrective silver mask consisting predominantly of coarse grain and being of lower gamma than said color developed records; and redeveloping in said yellow developed layer a part of said compound which corresponds essentially to said coarse grain record, to an extent sufficient to form a corrective silver mask of lower gamma than said color developed records.

RUSSELL W. CONANT.

References Cited in the file of this patent

UNITED STATES PATENTS

| Number | Name | Date |
|---|---|---|
| 2,193,023 | Evans et al. | Mar. 12, 1940 |
| 2,203,653 | Evans | June 4, 1940 |
| 2,231,663 | Evans et al | Feb. 11, 1941 |
| 2,336,243 | Hanson | Dec. 7, 1943 |
| 2,338,661 | Morris | Jan. 4, 1944 |

FOREIGN PATENTS

| Number | Country | Date |
|---|---|---|
| 512,608 | Great Britain | Sept. 21, 1939 |